United States Patent
Hatakeyama

(10) Patent No.: US 8,504,434 B2
(45) Date of Patent: Aug. 6, 2013

(54) COMMUNICATION DEVICE, COMMUNICATION METHOD, AND COMMUNICATION SYSTEM

(75) Inventor: Koichi Hatakeyama, Tokyo (JP)

(73) Assignee: Sony Corporation (JP)

( * ) Notice: Subject to any disclaimer, the term of this patent is extended or adjusted under 35 U.S.C. 154(b) by 70 days.

(21) Appl. No.: 13/115,252

(22) Filed: May 25, 2011

(65) Prior Publication Data

US 2011/0302042 A1 Dec. 8, 2011

(30) Foreign Application Priority Data

Jun. 2, 2010 (JP) ................. P2010-126856

(51) Int. Cl.
*G06Q 30/00* (2012.01)

(52) U.S. Cl.
USPC ........................................ 705/26.1

(58) Field of Classification Search
USPC ........................................ 705/26.1
See application file for complete search history.

(56) References Cited

U.S. PATENT DOCUMENTS

| 2002/0187776 A1* | 12/2002 | Brassil et al. ........ 455/417 |
| 2009/0227282 A1 | 9/2009 | Miyabayashi et al. |

FOREIGN PATENT DOCUMENTS

| JP | 2003-091704 A | 3/2003 |
| JP | 2009-218845 A | 9/2009 |

* cited by examiner

*Primary Examiner* — Mila Airapetian
(74) *Attorney, Agent, or Firm* — Lerner, David, Littenberg, Krumholz & Mentlik, LLP

(57) ABSTRACT

There is provided a communication device including a secure communication unit configured to perform secure communication, the secure communication being secure close-proximity communication, a high-speed communication unit configured to perform high-speed communication, the high-speed communication being close-proximity communication that is faster than the secure communication, and a power transmission unit configured to perform power transmission. Communication via the secure communication and the power transmission of the power transmission unit may be performed at timings that do not temporally overlap with each other.

14 Claims, 11 Drawing Sheets

FIG.3

| MONEY BALANCE | ATTRIBUTES |
|---|---|
| 310 | 320 |

— 300 MONEY INFORMATION MANAGEMENT TABLE

FIG.4

| CONTENT INFORMATION | CONTENT STATUS |
|---|---|
| 410 | 420 |

— 400 CONTENT INFORMATION MANAGEMENT TABLE

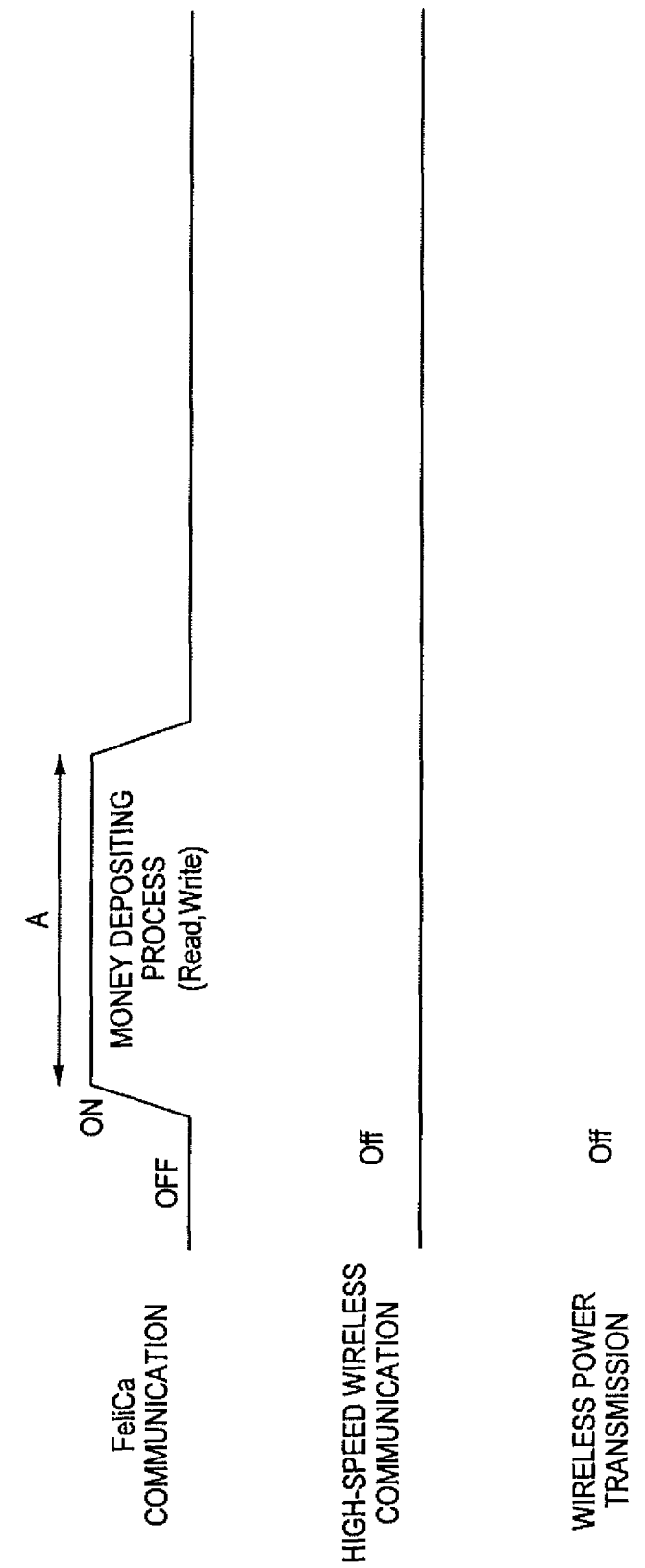

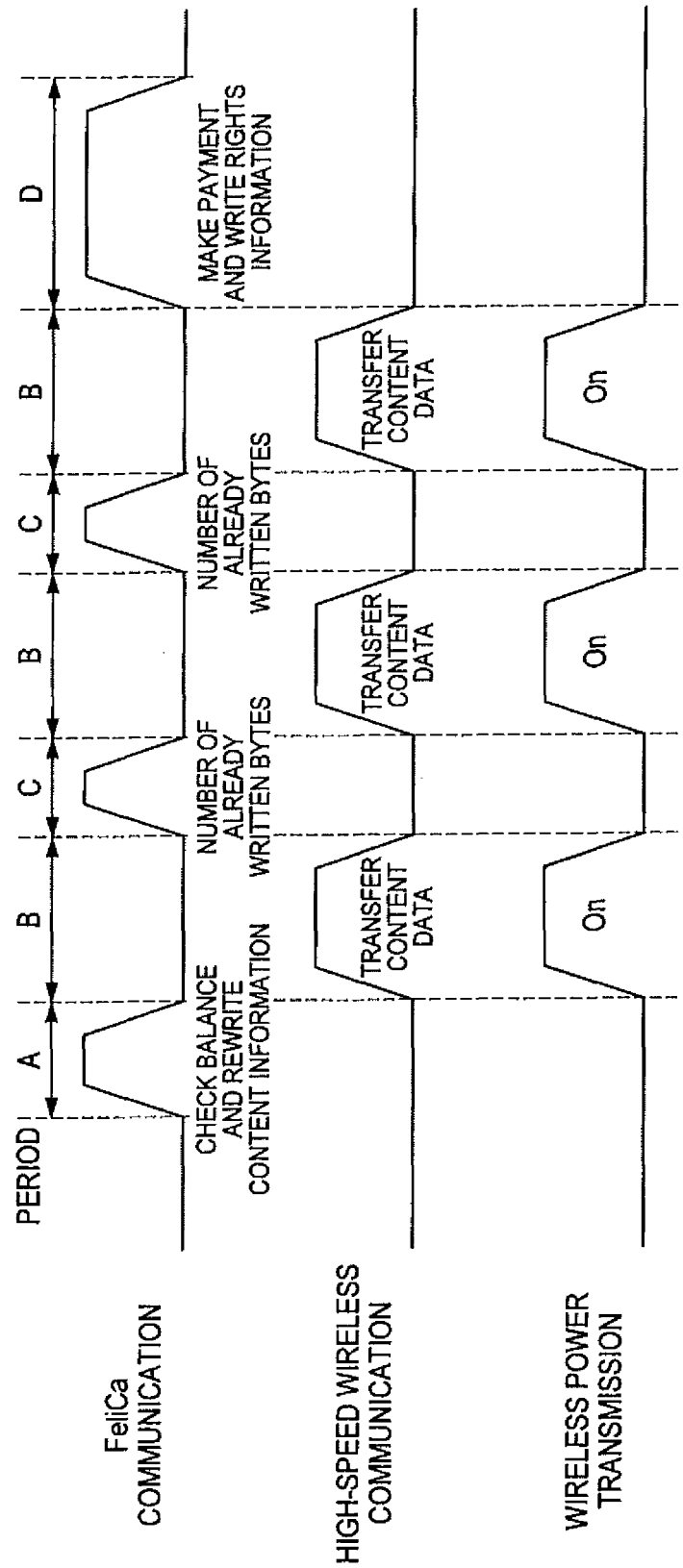

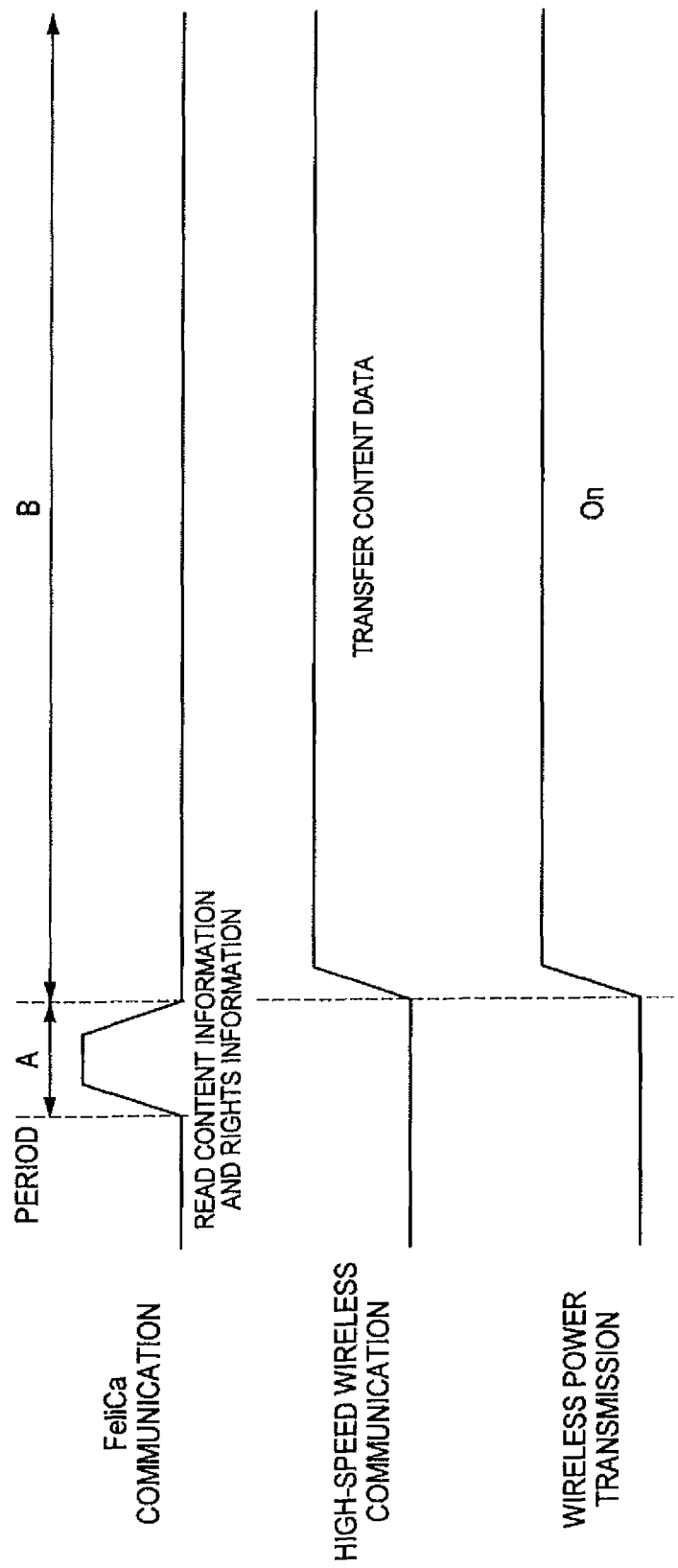

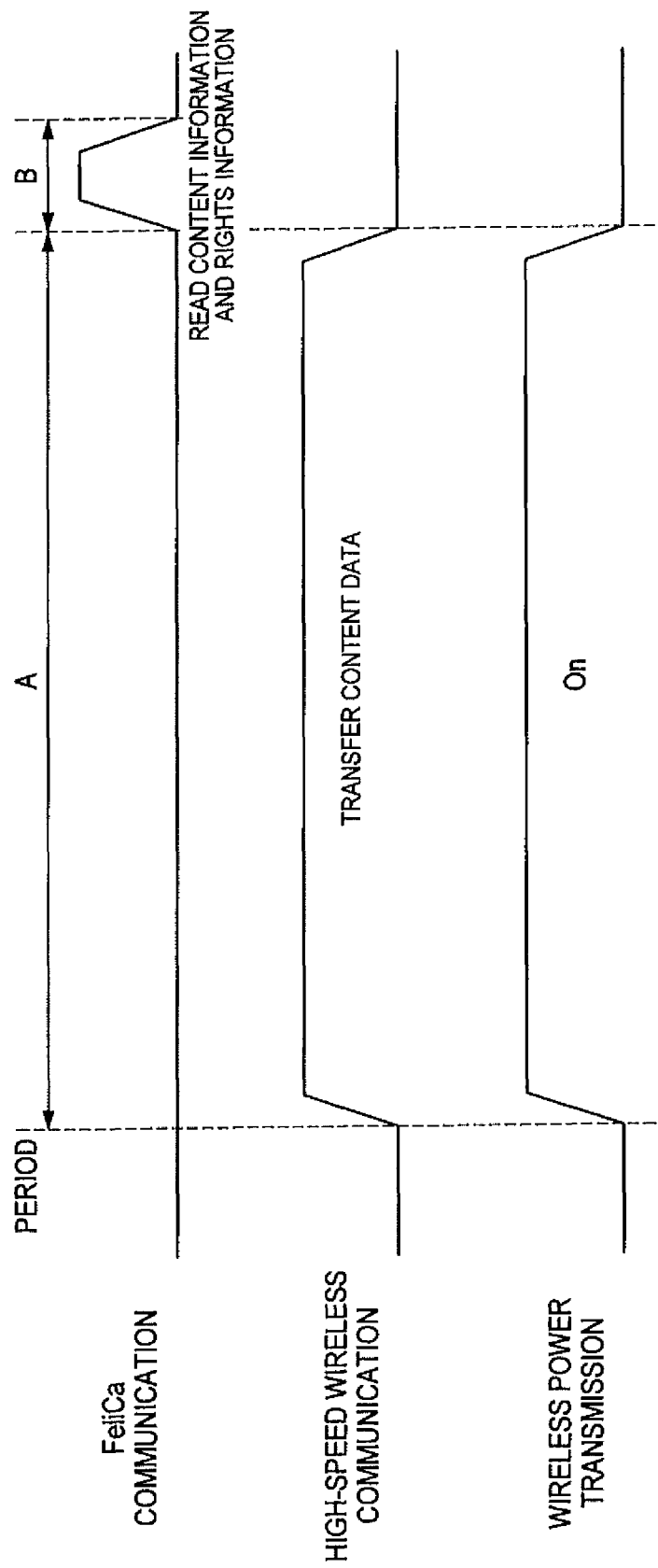

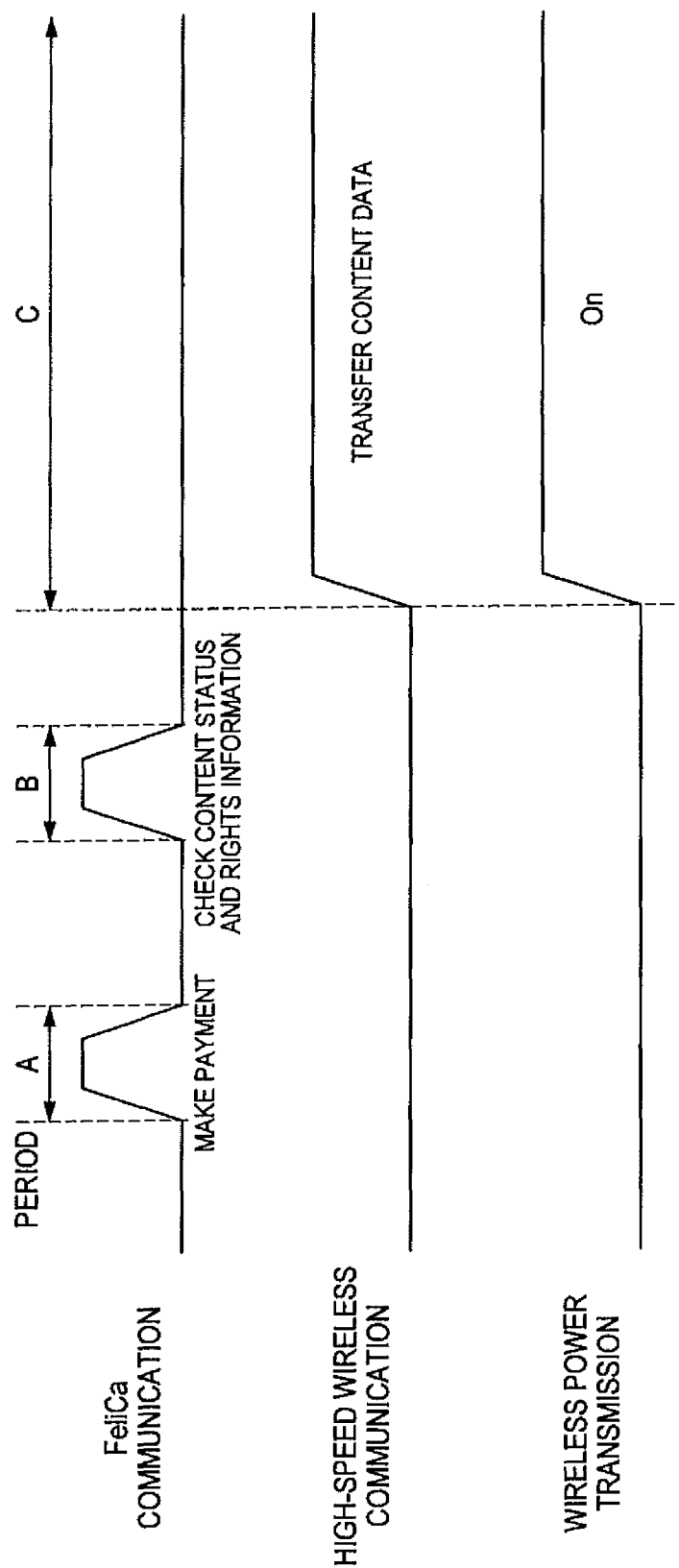

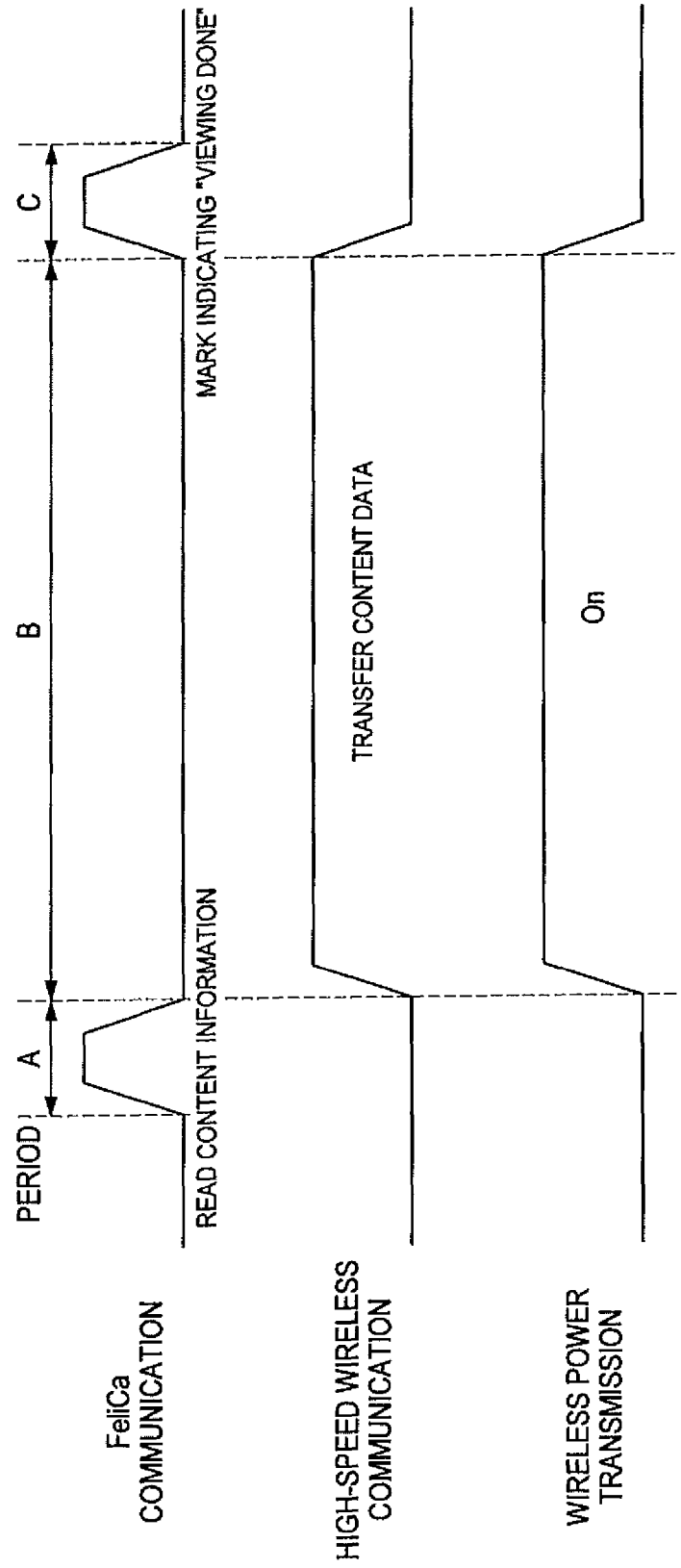

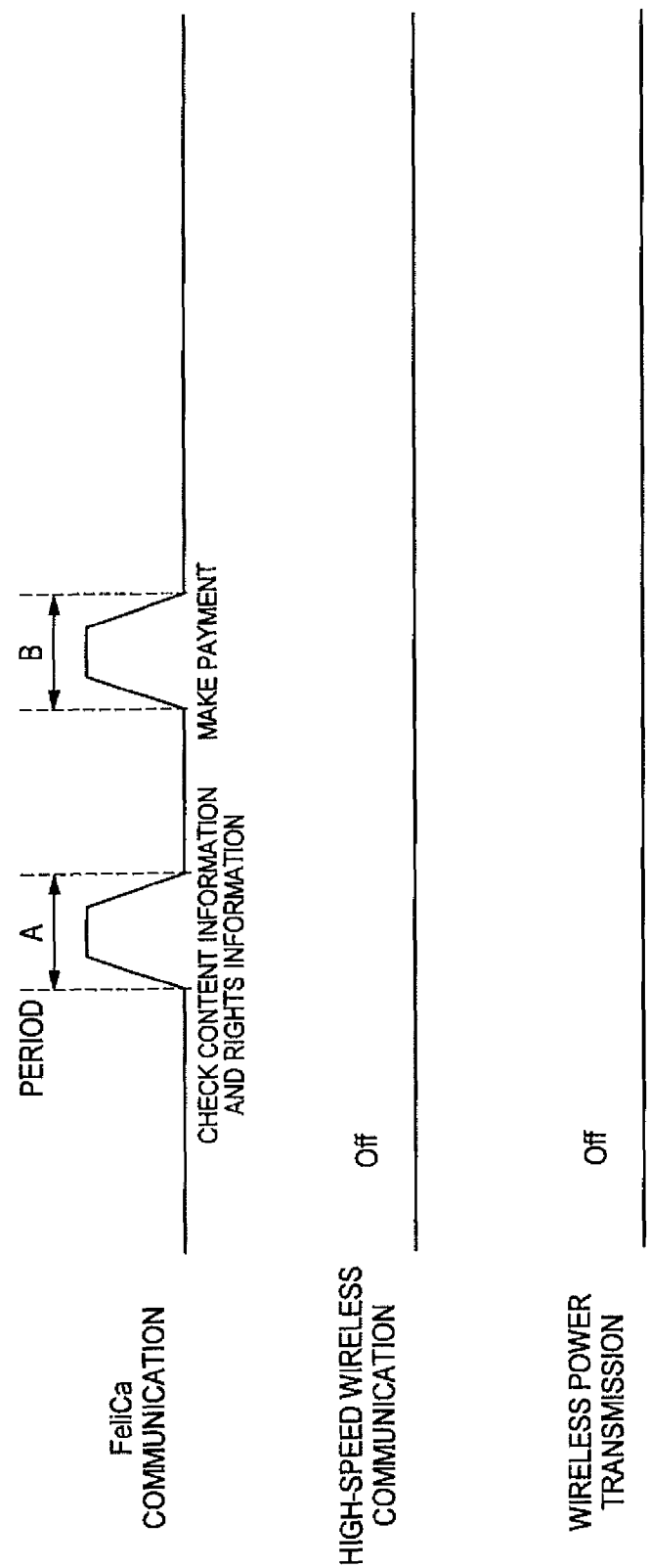

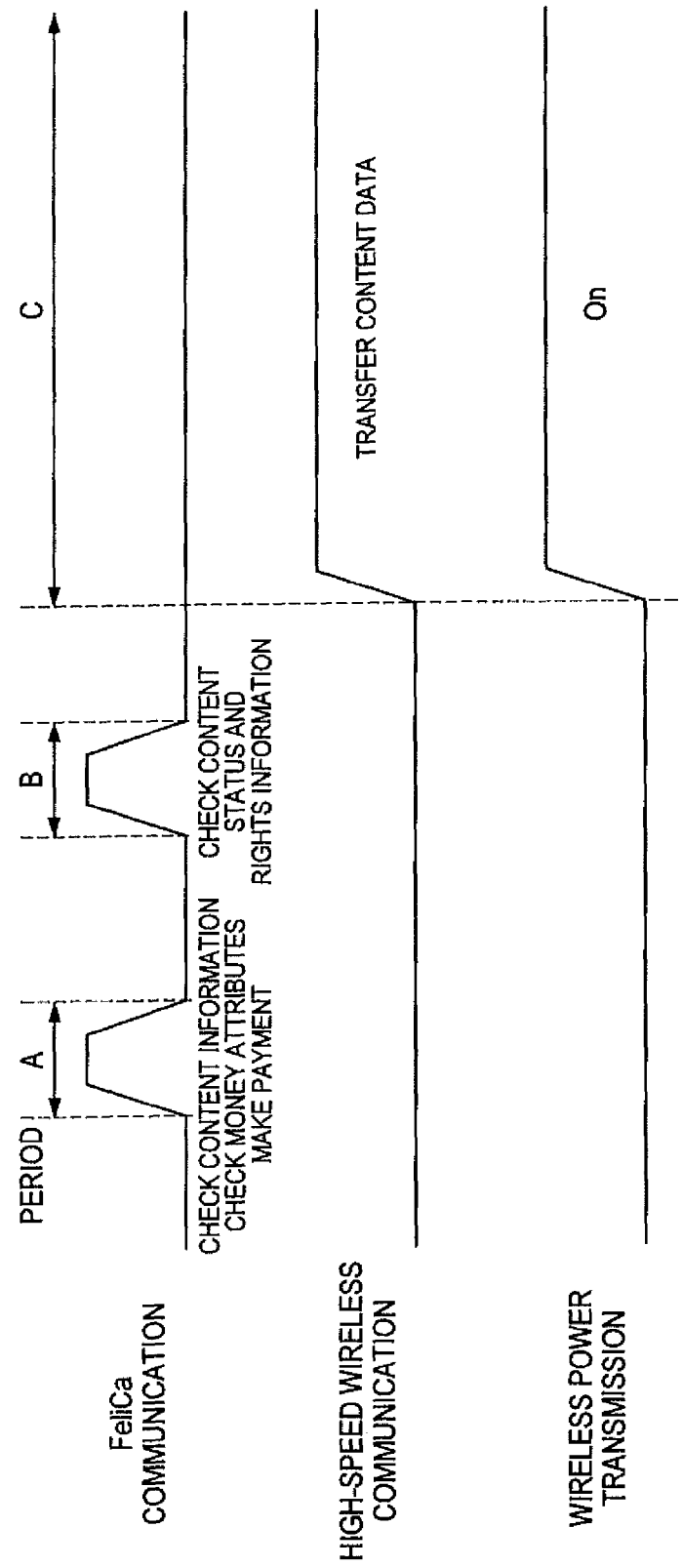

COMMUNICATION DEVICE, COMMUNICATION METHOD, AND COMMUNICATION SYSTEM

CROSS-REFERENCE TO RELATED APPLICATION

The present application claims priority from Japanese Patent Application No. JP 2010-126856 filed in the Japanese Patent Office on Jun. 2, 2010, the entire content of which is incorporated herein by reference.

BACKGROUND OF THE INVENTION

1. Field of the Invention

The present invention relates to a communication device, a communication method, and a communication system.

2. Description of the Related Art

In recent years, close-proximity communication in which contactless wireless communication over a short distance is performed with an IC (Integrated Circuit) card has been used for electronic commuter passes and electronic money, for example. Thus, electronic commuter passes that use close-proximity communication and mobile phones with an electronic money function have come into widespread use. Close-proximity communication is standardized in, for example, ISO/IEC 14443 and ISO/IEC 18092 (hereinafter also referred to as NFC (Near Field Communication)).

Exemplary communication modes for performing communication that complies with the NFC standards include communication modes called Type A, Type B, and Type C. Type C is adopted for an IC card system called FeliCa® of Sony Corporation that is the applicant of the present application.

By the way, in the aforementioned Type C, a carrier of 13.56 MHz is adopted, and close-proximity communication is performed at a communication rate of 212 kbps (kilo bit per second) or 424 kbps. Meanwhile, in Types A and B, close-proximity communication is performed at a communication rate of 106 kbps, which is lower than the communication rate of Type C. As described above, as the communication rate of NFC is about several hundred kbps, which is not very high, NFC is not considered to be suitable for transmission of large-volume data such as image contents.

Meanwhile, NFC allows mutual authentication to be performed by identifying a communication party only by passing an IC card over an R/W (Reader/Writer). Thus, there has been proposed a handover in which communication is performed first with NFC, and thereafter the communication mode is switched to a communication mode with a communication rate that is higher than the communication rate of NFC, such as a wireless LAN or Bluetooth® (for example, see JP 2009-218845A).

By the way, recently, close-proximity communication with a communication rate that is higher than the communication rate of NFC has come into widespread use. TransferJet™ is one exemplary communication mode of such high-speed close-proximity communication. In TransferJet™, a carrier of 4.48 GHz is adopted, and close-proximity communication is performed at a maximum communication rate of 560 Mbps.

When TransferJet™ described above is applied to an IC card system, an IC card and an R/W, which reads data from and writes data to the IC card, would be able to rapidly transfer large-volume data such as image contents to each other.

When a communication mode of high-speed close-proximity communication such as TransferJet™ is applied to an IC card system, each of an R/W and an IC card would be able to identify its communication party only by passing the IC card over the R/W without using a handover. Thus, rapid transfer of large-volume data such as image contents is possible.

Meanwhile, recently, there has also been known a method of billing for contents using a MMC and a wired secure chip as described in JP 2003-91704A.

SUMMARY OF THE INVENTION

However, as the content downloading so far has been realized with the use of personal computers, mobile phones, portable CE devices, and the like, all of such devices are assumed to have a built-in battery or be constantly on with an AC adapter. Although there is known a case in which a secure function is added to a flash such as a MMC so as to be compatible with billing as described in JP 2003-91704A, this technique is based on the presumption that all processes are performed with a wired terminal.

In light of the foregoing, it is desirable to provide a novel and improved communication device, communication method, and communication system that allow content downloading and a billing process to be all performed via wireless communication to thereby allow purchase of fee-based contents through a simple operation.

According to an embodiment of the present invention, there is provided a communication device including a secure communication unit configured to perform secure communication, the secure communication being secure close-proximity communication, a high-speed communication unit configured to perform high-speed communication, the high-speed communication being close-proximity communication that is faster than the secure communication, and a power transmission unit configured to perform power transmission. Communication via the secure communication and the power transmission of the power transmission unit may be performed at timings that do not temporally overlap with each other.

The communication device may further include a content storage unit configured to store a content that has been downloaded via the high-speed communication, a secure memory configured to hold information on the content, and an information writing unit configured to, when the content is downloaded, write payment information on the downloading of the content into the secure memory via the secure communication.

When the content is downloaded, downloading via the high-speed communication and writing of the amount of data that has been downloaded to the secure memory may be alternately performed.

The communication device may further include a content storage unit configured to store multiple contents, a secure memory configured to hold information on the contents, and an information writing unit configured to, before the contents are transferred to a reader/writer device via the high-speed communication, write payment information on at least one of the multiple contents to the secure memory via the secure communication. The content whose payment information has been written among the multiple contents may be transferred to the reader/writer device via the high-speed communication.

The communication device may further include a content storage unit configured to store multiple contents, a secure memory configured to hold information on the contents, an information writing unit configured to, when at least one of the contents has been transferred to a reader/writer device, write transfer complete information to the secure memory via the secure communication, the transfer complete information indicating that the transfer of the content is complete, and a payment processing unit configured to make a payment for the transferred content on the basis of the transfer complete information.

The communication device may further include a content storage unit configured to store multiple contents, a secure memory configured to hold information on the contents, and a payment processing unit configured to, before contents are transferred to the reader/writer device, make a payment for a content that is permitted to be paid for among the multiple contents, via the secure communication. The content that has been paid for among the multiple contents may be transferred to the reader/writer device via the high-speed communication.

According to another embodiment of the present invention, there is provided a communication method including the steps of: storing a content that has been downloaded via high-speed communication, and writing, when the content is downloaded, payment information on the downloading of the content to a secure memory via secure communication, the secure communication being secure close-proximity communication that is slower than the high-speed communication.

According to further another embodiment of the present invention, there is provided a communication method including the steps of storing multiple contents in a content storage unit, holding information on the contents in a secure memory, writing, before contents are transferred to a reader/writer device via high-speed communication, payment information on at least one of the contents to the secure memory via secure communication, the secure communication being secure close-proximity communication that is slower than the high-speed communication, and transferring to the reader/writer device via the high-speed communication the content whose payment information has been written among the multiple contents.

According to still another embodiment of the present invention, there is provided a communication method including the steps of storing multiple contents in a content storage unit, holding information on the contents in a secure memory, writing, when at least one of the contents has been transferred to a reader/writer device via high-speed communication, transfer complete information to the secure memory via secure communication, the transfer complete information indicating that the transfer of the content is complete, and the secure communication being secure close-proximity communication that is slower than the high-speed communication, and making a payment for the transferred content on the basis of the transfer complete information.

According to yet another embodiment of the present invention, there is provided a communication method including the steps of storing multiple contents in a content storage unit, holding information on the contents in a secure memory, making, before transferring the contents to a reader writer via high-speed communication, a payment for a content that is permitted to be paid for among the multiple contents, via secure communication, the secure communication being secure close-proximity communication that is slower than the high-speed communication, and transferring the content that has been paid for among the multiple contents to the reader/writer device via the high-speed communication.

According to yet another embodiment of the present invention, there is provided a communication system including a communication device, and a reader/writer device, in which the communication device includes a secure communication unit configured to perform secure communication that is secure close-proximity communication, and a high-speed communication unit configured to perform high-speed communication that is faster close-proximity communication than the secure communication. Communication via the secure communication and the power transmission of the power transmission unit may be performed at timings that do not temporally overlap with each other, and the reader/writer device is configured to perform one of the secure communication with, the high-speed communication with, and the power transmission to the communication device.

The communication device may further include a content storage unit configured to store multiple contents, a secure memory configured to hold information on the contents, and an information writing unit configured to, before the contents are transferred to the reader/writer device, write payment information on at least one of the contents to the secure memory. The content whose payment information has been written among the multiple contents may be transferred to the reader/writer device via the high-speed communication.

The communication device may further include a content storage unit configured to store multiple contents, a secure memory configured to hold information on the contents, an information writing unit configured to, when at least one of the contents has been transferred to the reader/writer device, write transfer complete information to the secure memory via the secure communication, the transfer complete information indicating that the transfer of the content is complete, and a payment processing unit configured to make a payment for the transferred content on the basis of the transfer complete information.

The communication device may further include a content storage unit configured to store multiple contents, a secure memory configured to hold information on the contents, and a payment processing unit configured to, when at least one of the contents has been transferred to a reader/writer device via high-speed communication, make a payment based on transfer complete information indicating the transfer of the content. The content that has been paid for among the multiple contents may be transferred to the reader/writer device via the high-speed communication.

The communication device may further include a content storage unit configured to store multiple contents, a secure memory configured to hold information on the contents, and a payment processing unit configured to, before the contents are transferred to the reader/writer device, make a payment for a content that is permitted to be paid for among the multiple contents, via the secure communication. The content that has been paid for among the multiple contents may be transferred to the reader/writer device via the high-speed communication.

According to the embodiments of the present invention described above, content downloading and a billing process can be all performed via wireless communication, whereby fee-based contents can be purchased through a simple operation.

BRIEF DESCRIPTION OF THE DRAWINGS

FIG. 3 is a schematic diagram showing the structure of money information accumulated in the billing-compatible card-type contactless communication medium;

FIG. 4 is a schematic diagram showing the structure of content information accumulated in the billing-compatible card-type contactless communication medium;

FIG. 5 is a timing chart showing a sequence of a process of depositing money into the billing-compatible card-type contactless communication medium;

FIG. 6 is a timing chart showing a sequence of content writing and a payment process when a "download simple billing" method is executed;

FIG. 7 is a timing chart showing a content reading sequence when the "download simple billing" method is executed;

FIG. 8 is a timing chart showing a sequence of an advanced content writing process when a "multiple-content prepayment" method is executed;

FIG. 9 is a timing chart showing a sequence of a billing process and content reading when the "multiple-content prepayment" method is executed;

FIG. 10 is a timing chart showing a content reading sequence when a multiple-content postpayment" method is executed;

FIG. 11 is a timing chart showing a sequence of a post-billing process when the "multiple-content postpayment" method is executed; and FIG. 12 is a timing chart showing a sequence of content writing and a billing process when a "target content limited billing" method is executed.

DETAILED DESCRIPTION OF THE EMBODIMENTS

Figure 1:
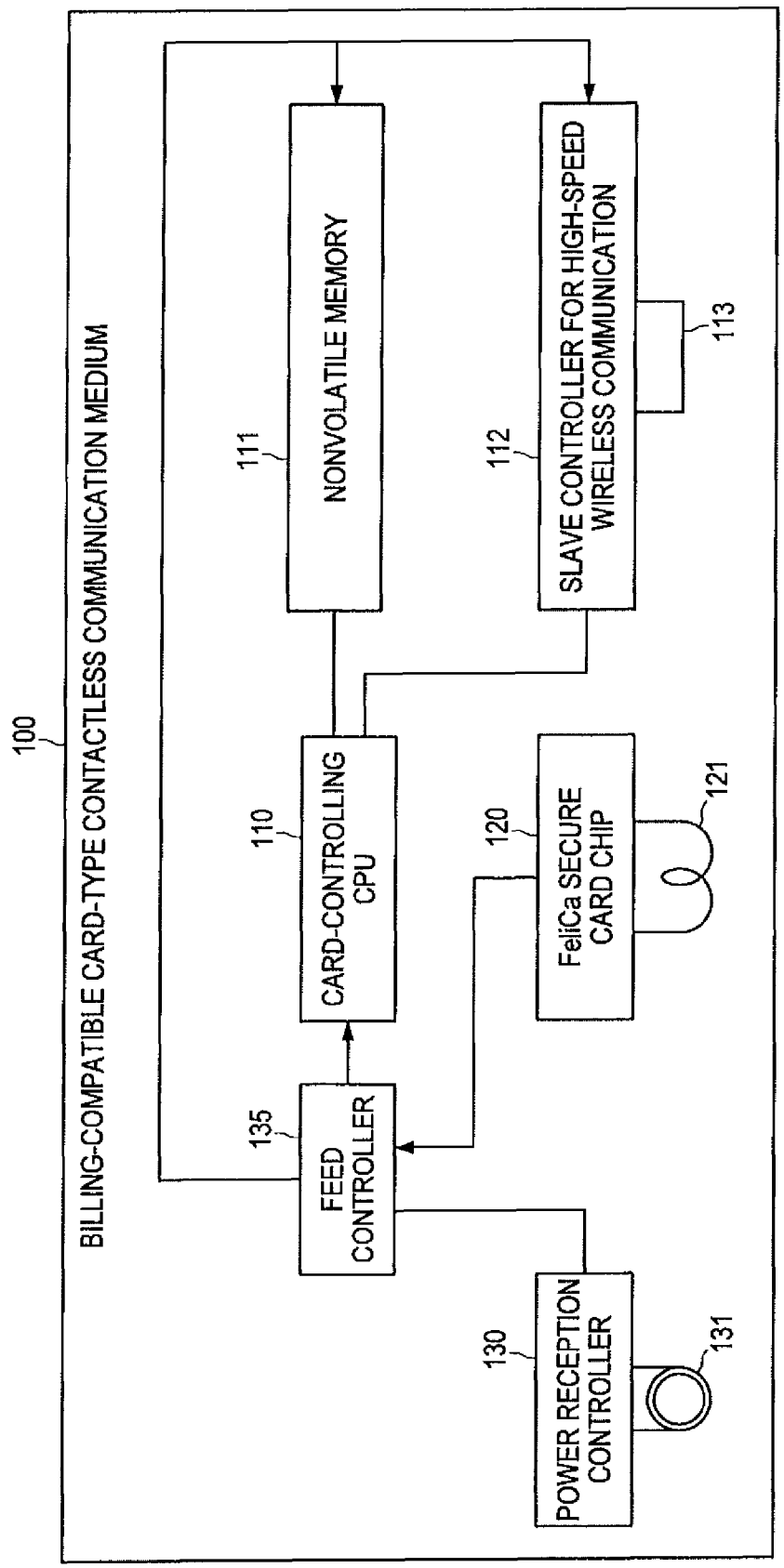
FIG. 1 is a schematic diagram showing an exemplary hardware configuration of a billing-compatible card-type contactless communication medium in accordance with one embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Note that description will be given in the following order.
1. Overview of the Present Embodiment
2. Specific Exemplary Configuration of System in Accordance with the Present Embodiment
3. Exemplary Configuration of Reader/Writer
4. Process when Contactless Communication Medium and R/W are Brought in Proximity to Each other
5. Process Related to Wireless Power Transmission
6. Encryption Process in High-Speed Wireless Communication
7. Structure of Money Information
8. Structure of Content Information
9. Specific Procedure of Each Process

1. Overview of the Present Embodiment

The present embodiment provides four types of use methods, which are related to billing and the like, for a system that utilizes a card-type contactless communication medium (hereinafter also referred to as a media card) used as an electronic money card or the like. Specifically, the following four methods are provided: "download simple billing," "multiple-content prepayment," "multiple-content postpayment," and "target content limited billing." An overview of these methods will be described hereinafter.

The "download simple billing" relates to a method of, when a content to be purchased is searched for through a kiosk terminal or the like, and thereafter downloading of the desired content and writing (downloading) of the content to a media card are completed, making a payment with the same media card.

The multiple-content prepayment" is a method of, in the presence of a media card to which multiple contents have been written in advance, making a prepayment for only a content that a user wants to view, so that the user is permitted to view the content. With the prepayment method, a user can purchase a media card with a desired content written thereto.

The "multiple-content postpayment" is a method of, in the presence of a media card to which multiple contents have been written in advance, making a postpayment for only a content that a user has viewed. This method corresponds to, for example, a case in which multiple contents are written to a media card at a rental shop or the like, and a payment process is performed with the same media card for only a content that the user has actually viewed at his home, when he returns the card to the shop.

In the "target content limited billing," a media card is configured to be capable of, for example, purchasing three types of contents such as movies, music, and games. This is a method of, when depositing money into a media card in advance, giving an attribute that indicates which content the deposited money is valid for, so that contents other than a specific content would not be permitted to be purchased. This method is effective for depositing money into a card for a specific content so that the card can be used like a coupon, or when contents that can be purchased with a child's media card are restricted to those that can be purchased by his parents.

2. Exemplary Configuration of Contactless Communication Medium

FIG. 1 is a schematic diagram showing the hardware configuration of a billing-compatible card-type contactless communication medium 100 in accordance with the present embodiment. The contactless communication medium 100 includes a card-controlling CPU 110, nonvolatile memory 111 for storing large-volume data, and a slave controller 112 for high-speed wireless communication. The billing-compatible card-type contactless communication medium 100 herein corresponds to a medium such as an electronic money card or a device such as a mobile phone.

The contactless communication medium 100 functions as a slave communication device for receiving power, which is transmitted by wireless power transmission, to perform high-speed wireless communication, which is faster than secure close-proximity communication, with an R/W 200 (described later).

That is, the contactless communication medium 100 includes a medium-controlling CPU (Central Processing Unit) 110, nonvolatile memory 111, a slave controller 112 for high-speed wireless communication, an antenna 113 for high-speed wireless communication, a secure communication chip (FeliCa secure card chip) 120, an antenna (FeliCa card antenna) 121 for secure communication, a power reception controller 130, a power reception antenna 131, and a feed controller 135.

The card-controlling CPU 110 is connected to the nonvolatile memory 111 and the slave controller 112 for high-speed wireless communication via buses to control the nonvolatile memory 111 and the slave controller 112 for high-speed wireless communication.

The nonvolatile memory 111 is, for example, high-capacity (e.g., 6 GB or 8 GB) NAND flash memory that, under the control of the card-controlling CPU 110, stores data such as contents provided from the card-controlling CPU 110, and the stored data is read and provided to the card-controlling CPU 110.

The data written to or read from the nonvolatile memory 111 is exchanged via the card-controlling CPU 110 through high-speed communication performed by the slave controller 112 for high-speed wireless communication.

The slave controller 112 for high-speed wireless communication is connected to the antenna 113 for high-speed wireless communication, and functions as a slave-side high-speed communication means that performs high-speed wireless communication as close-proximity communication, which is faster than the secure communication performed by the secure communication chip 120 (described later), with the R/W 200.

Herein, as an exemplary communication mode of the high-speed communication, TransferJet™ capable of high-speed close-proximity communication can be adopted.

Besides, as other exemplary communication modes of the high-speed communication, a communication mode that complies with the high-speed wireless communication standards, such as a wireless LAN, a wireless USB (Universal Serial Bus), or Bluetooth® can be adopted.

Note that the high-speed communication need not be secure communication. Thus, if a communication mode that incorporates an encryption technology is adopted as a communication mode of the high-speed communication, the encryption technology need not be used.

In this embodiment, TransferJet™, for example, is adopted as a communication mode of the high-speed communication. Thus, in the high-speed communication performed by the slave controller 112 for high-speed wireless communication, close-proximity communication at a maximum communication rate of 560 Mbps is performed with a carrier of 4.48 GHz.

The secure communication chip 120 is connected to the antenna 121 for secure communication, and functions as a slave-side secure communication means with tamper-resistant properties that performs secure wireless communication as secure close-proximity communication with the R/W 200 via the antenna 121 for secure communication.

Herein, as an exemplary communication mode of the secure communication performed by the secure communication chip 120, FeliCa® capable of secure close-proximity communication can be adopted. Besides, as other exemplary communication modes of the secure communication, a communication mode that complies with the wireless communication standards such as NFC and capable of secure close-proximity communication can be adopted (e.g., Type A or B).

In this embodiment, FeliCa® is adopted as a communication mode of the secure communication. Thus, in the secure communication, close-proximity communication at a communication rate of 212 kbps is performed with a carrier of 13.56 MHz.

The secure communication chip 120 performs mutual authentication with a communication party, and when the mutual authentication has been successful, performs secure communication by encrypting a communication channel, that is, by encrypting data to be exchanged using an encryption key that is obtained by the mutual authentication.

The secure communication chip 120 has a terminal for controlling the feed controller 135, and the terminal is connected to the feed controller 135 via a signal line.

The secure communication chip 120 controls the feed controller 135 by supplying switch control information (described later) to the feed controller 135.

Note that the secure communication chip 120 performs secure communication by operating with power, which has been obtained from an RF (Radio Frequency) signal for secure communication from the R/W 200, and received by the antenna 121 for secure communication, as a power source.

The power reception controller 130 is connected to the power reception antenna 131 and the feed controller 135.

The power reception controller 130 receives power for performing high-speed communication, which is transmitted from the R/W 200 by wireless power transmission, via the power reception antenna 131, and supplies the power to the feed controller 135, and also supplies the power to the card-controlling CPU 110, the nonvolatile memory 111, and the slave controller 112 for high-speed wireless communication via the feed controller 135.

Herein, the card-controlling CPU 110, the nonvolatile memory 111, and the slave controller 112 for high-speed wireless communication perform high-speed communication by operating with the power supplied from the power reception controller 130 via the feed controller 135 as a power source, as described above.

The feed controller 135 also operates with the power supplied from the power reception controller 130 as a power source.

Note that as an exemplary transmission scheme of the wireless power transmission performed between the power reception controller 130 and the R/W 200, electromagnetic induction can be used. Besides, as another exemplary transmission scheme of the wireless power transmission, a wireless power transmission scheme such as magnetic resonance can be used.

Wireless power transmission using electromagnetic induction is superior in power transmission efficiency to wireless power transmission using magnetic resonance, but is inferior in tolerance for displacement of antennas (displacement of an antenna for transmitting power with respect to an antenna for receiving power). Conversely, wireless power transmission using magnetic resonance is superior in tolerance for displacement of antennas to wireless power transmission using electromagnetic induction, but is inferior in power transmission efficiency.

The feed controller 135 feeds the power for the contactless communication medium 100 to perform high-speed communication with the R/W 200.

That is, the feed controller 135 feeds the power from the power reception controller 130 to the following blocks for performing high-speed communication: the card-controlling CPU 110, the nonvolatile memory 111, and the slave controller 112 for high-speed wireless communication.

Specifically, the feed controller 135 has a built-in switch for feeding power, and turns on or off the switch in accordance with the switch control information supplied from the secure communication chip 120. Accordingly, the power from the power reception controller 130 is supplied to the following blocks for performing high-speed communication: the card-controlling CPU 110, the nonvolatile memory 111, and the slave controller 112 for high-speed wireless communication, or alternatively, the power supply is shut off.

In the contactless communication medium 100 with the configuration described above, the card-controlling CPU 110, the nonvolatile memory 111, the slave controller 112 for high-speed wireless communication, the power reception controller 130, and the feed controller 135 operate with the power sent (transmitted) from the R/W 200 by wireless power transmission, while the secure communication chip 120 operates with power obtained from an RF signal for secure communication from the R/W 200.

Therefore, the contactless communication medium 100 does not have a power supply (battery), and can thus be formed in a (compact) card shape with about the same size as an IC card (or an IC chip) functioning as an electronic commuter pass, electronic money, or the like.

In FIG. 1, protected contents are stored in the nonvolatile memory 111. The slave controller 112 for high-speed wireless communication includes an antenna for high-speed wireless communication. The card-controlling CPU 110, the nonvolatile memory 111, and the slave controller 112 for high-speed wireless communication are connected with buses.

The billing-compatible card-type contactless communication medium 100 also includes the FeliCa secure card chip 120, and the card chip 120 includes the FeliCa card antenna 121. In this embodiment, the card chip 120 is a chip with a tamper-resistant function. Money information held by the billing-compatible card-type contactless communication medium 100 is stored in flash memory (secure memory: not shown) that the card chip 120 has. Therefore, the card chip 120 functions as an information writing unit that writes information to the flash memory as well as a payment processing unit that performs a payment process on the basis of the money information.

As shown in FIG. 1, the billing-compatible card-type contactless communication medium 100 includes the power reception controller 130. The power reception controller 130 includes a power reception antenna. The power reception controller 130 receives power from the outside, and supplies the power to the card-controlling CPU 110, the nonvolatile memory 111 for storing data, and the slave controller 112 for high-speed wireless communication.

Note that the card chip 120 generates an electromotive force with the RF received by the FeliCa card antenna 121, and can thus be booted independently of the power reception controller 130.

3. Exemplary Configuration of Reader/Writer

Figure 2:
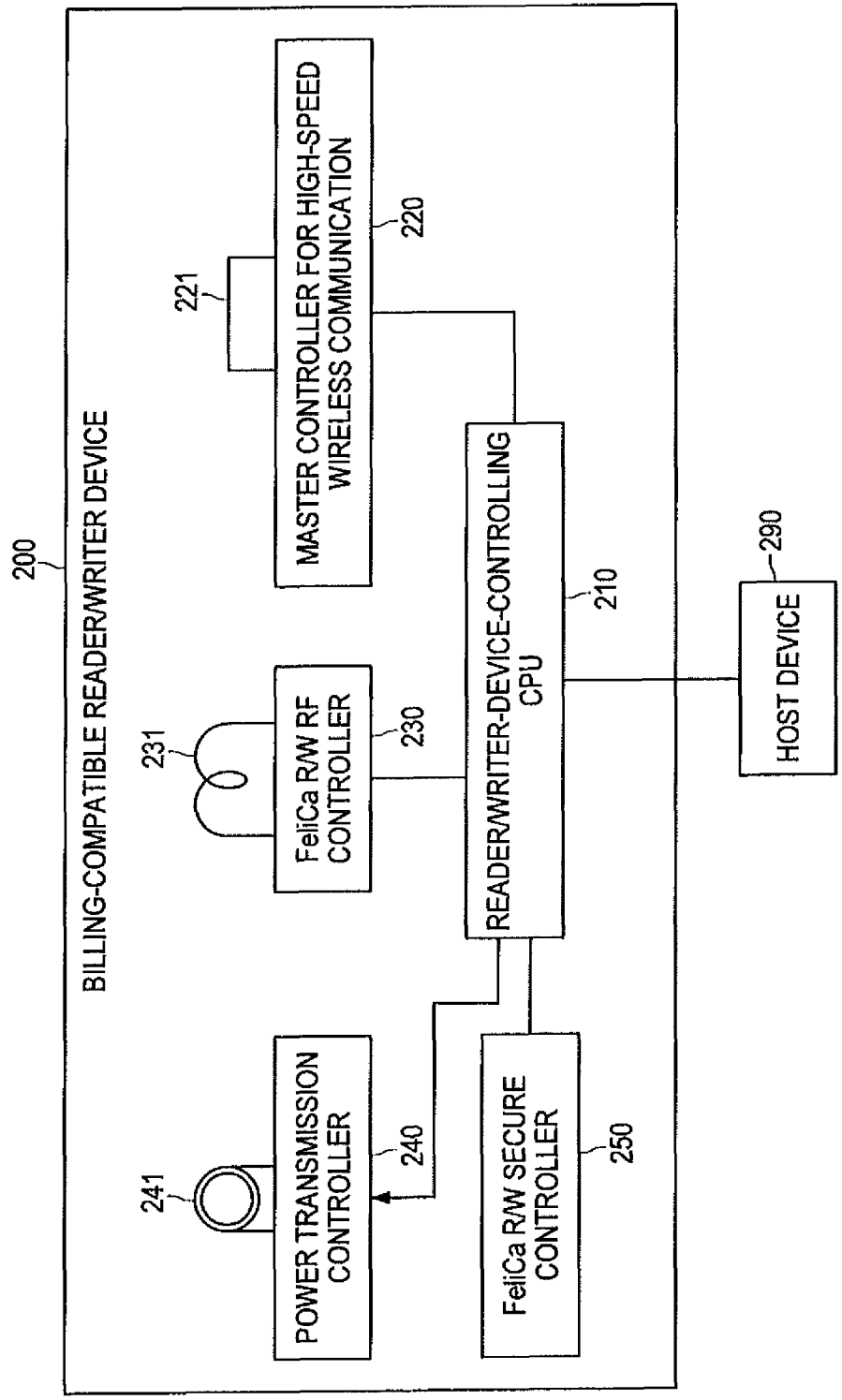
FIG. 2 is a schematic diagram showing an exemplary hardware configuration of a billing-compatible reader/writer device (reader/writer: hereinafter also referred to as R/W)

FIG. 2 is a schematic diagram showing the hardware configuration of the billing-compatible reader/writer device (reader/writer: hereinafter also referred to as R/W). The R/W 200 functions as a master communication device for transmitting power, which is used for the contactless communication medium 100 to perform high-speed communication, by wireless power transmission.

That is, the R/W 200 includes an R/W-controlling CPU 210, a master controller 220 for high-speed wireless communication, an antenna 221 for high-speed wireless communication, a controller 230 for secure communication, an antenna 231 for secure communication, a power transmission controller 240, a power transmission antenna 241, and a controller 250 for secure processing.

The R/W-controlling CPU 210 is connected to a host device 290 via a predetermined bus such as a USB, for example.

Further, the R/W-controlling CPU 210 is also connected to the master controller 220 for high-speed wireless communication, the controller 230 for secure communication, and the controller 250 for secure processing via buses. The R/W-controlling CPU 210 controls the master controller 220 for high-speed wireless communication, the controller 230 for secure communication, and the controller 250 for secure processing under the control of the host device 290 or the like.

The R/W-controlling CPU 210 is also connected to the power transmission controller 240 via a single general-purpose I/O (Input/Output) (interface) to control the power transmission controller 240.

The master controller 220 for high-speed wireless communication is connected to the antenna 221 for high-speed wireless communication, and functions as a master-side communication means that performs high-speed wireless communication with the slave controller 112 for high-speed wireless communication of the contactless communication medium 100 via the antenna 221 for high-speed wireless communication.

The controller 230 for secure communication is connected to the antenna 231 for secure communication, and functions as a master-side secure communication means that performs secure wireless communication with the secure communication chip 120 of the contactless communication medium 100 via the antenna 231 for secure communication.

That is, the controller 230 for secure communication outputs an RF signal via the antenna 231 for secure communication for polling purposes.

Meanwhile, when the contactless communication medium 100 is passed over the R/W 200 and the contactless communication medium 100 (the antenna 121 for secure communication) is thus brought in proximity to the R/W 200 (the antenna 231 for secure communication), the secure communication chip 120 of the contactless communication medium 100 returns a response to the polling from the controller 230 for secure communication of the R/W 200 (the response is transmitted using load modulation).

The controller 230 for secure communication of the R/W 200, upon receiving the response from the secure communication chip 120 of the contactless communication medium 100, informs the R/W-controlling CPU 210 of the reception of the response. Accordingly, the R/W-controlling CPU 210 recognizes that the contactless communication medium 100 has been brought in proximity to the R/W 200.

Herein, if FeliCa® is used as a communication mode of the secure communication as described above, for example, a FeliCa® R/W is adopted as the controller 230 for secure communication.

The power transmission controller 240 is connected to the power transmission antenna 241, and transmits power, which is necessary for the contactless communication medium 100 to perform high-speed communication, via the power transmission antenna 241 by wireless power transmission.

The controller 250 for secure processing has tamper-resistant properties, and performs secure processing, for example, a process of encrypting a communication channel, which is necessary for the controller 230 for secure communication to perform secure communication.

Herein, if FeliCa® is used as a communication mode of the secure communication as described above, for example, a secure chip that performs secure processing of FeliCa® is adopted as the controller 250 for secure processing.

Note that power that is necessary for the R/W 200 to operate is supplied to the R/W 200 from the host device 290 or a power source (not shown).

4. Process when Contactless Communication Medium and R/W are Brought in Proximity to Each Other The R/W 200, upon recognizing that the R/W 200 has been normally identified by the host device 290, enters a medium wait mode to wait for the contactless communication medium 100 to be passed over the R/W 200 and thus brought in proximity to the R/W 200. When the R/W 200 has entered the medium wait mode, the R/W-controlling CPU 210 transmits to the controller 230 for secure communication a secure communication polling request command requesting for polling to be performed for secure communication.

The controller 230 for secure communication, upon receiving the secure communication polling request command from the R/W-controlling CPU 210, transmits a secure communication polling packet (with an RF signal) as polling via the antenna 231 for secure communication in response to the secure communication polling request command.

Herein, if the contactless communication medium 100 is not in proximity to the R/W 200, there will be no response to the secure communication polling packet. If there is no response to the secure communication polling packet, the controller 230 for secure communication does not return a response to the secure communication polling request command from the R/W-controlling CPU 210 to the R/W-controlling CPU 210. The R/W-controlling CPU 210, if there is no response to the secure communication polling request command, periodically transmits secure communication polling request commands to the controller 230 for secure communication. Accordingly, the controller 230 for secure communication periodically transmits secure communication polling packets.

Thereafter, when the contactless communication medium 100 is passed over the R/W 200 and thus brought in proximity to the R/W 200, the secure communication chip 120 of the contactless communication medium 100 receives the secure communication polling packet, and transmits a secure communication polling response packet as a response to the secure communication polling packet via the antenna 121 for secure communication.

The controller 230 for secure communication of the R/W 200, upon receiving the secure communication polling response packet from the secure communication chip 120 of the contactless communication medium 100, transmits a medium detection response, which indicates that a medium has been detected, to the R/W-controlling CPU 210 in accordance with the received secure communication polling response packet, as a response to the secure communication polling request command.

The R/W-controlling CPU 210, upon receiving the medium detection response from the controller 230 for secure communication, recognizes that a medium has been detected from the medium detection response.

Thereafter, the R/W-controlling CPU 210, upon receiving the (latest) status check packet from the host device 290, returns a medium detection packet, which indicates that a medium has been detected, to the host device 290 in response to the status check packet.

As shown in FIG. 2, the billing-compatible reader/writer device 200 has mounted thereon the controller 250 for secure processing as one distinctive feature of the hardware configuration. Herein, the controller 250 for secure processing is assumed to be a chip with a tamper-resistant function.

The R/W-controlling CPU 210, the master controller 220 for high-speed wireless communication, the controller 230 for secure communication, and the controller 250 for secure processing are connected with buses. In addition, the R/W-controlling CPU 210 and the power transmission controller 240 are connected with a single general-purpose I/O.

The R/W-controlling CPU 210 is connected to the host device 290 via a bus. The host device 290 can be a device such as, for example, a personal computer (PC) or a television receiver. This embodiment is based on the assumption that a bus connecting the billing-compatible reader/writer device 200 and the host device 290 is a USB. However, the USB can be replaced with another bus.

Hereinafter, mutual authentication will be described. The R/W-controlling CPU 210 transmits to the controller 250 for secure processing a mutual authentication start request command 310 requesting for mutual authentication. The controller 250 for secure processing, upon receiving the mutual authentication start request command from the R/W-controlling CPU 210, returns a mutual authentication response 311, which is a response to the mutual authentication start request command 310, to the R/W-controlling CPU 210.

The R/W-controlling CPU 210, upon receiving the mutual authentication response 311 from the controller 250 for secure processing, transmits to the controller 230 for secure communication a mutual authentication request command 320 requesting for data exchange for mutual authentication, in accordance with the mutual authentication response 311.

The controller 230 for secure communication, upon receiving the mutual authentication request command 320 from the R/W-controlling CPU 210, starts data exchange for mutual authentication in accordance with the mutual authentication request command 320. That is, the controller 230 for secure communication transmits a mutual authentication packet 321, which is supplied from the controller 250 for secure processing via the R/W-controlling CPU 210 and includes data for mutual authentication, to the contactless communication medium 100.

The secure communication chip 120 of the contactless communication medium 100, upon receiving the mutual authentication packet 321 from the controller 230 for secure communication, performs a necessary authentication process in accordance with the mutual authentication packet 321.

Then, the secure communication chip 120, in accordance with the result of the authentication process, starts to supply switch control information for turning on or off the built-in switch of the feed controller 135 (FIG. 1) to the feed controller 135.

At this timing, the R/W 200 is not performing wireless power transmission, and thus the feed controller 135 of the contactless communication medium 100 is not supplied with power. Thus, the feed controller 135 is not operating.

The secure communication chip 120, upon terminating the authentication process in accordance with the mutual authentication packet 321 from the controller 230 for secure communication, returns a mutual authentication response packet 322, which includes data for mutual authentication, as a response to the mutual authentication packet 321.

The controller 230 for secure communication, upon receiving the mutual authentication response packet 322 from the secure communication chip 120, returns a mutual authentication response 323, which contains similar information to the mutual authentication response packet 322, to the controller 250 for secure processing via the R/W-controlling CPU 210.

Data that is necessary for mutual authentication is exchanged between the secure communication chip 120 of the contactless communication medium 100 and the controller 250 for secure processing of the R/W 200 via the R/W-controlling CPU 210 and the controller 230 for secure communication, whereby mutual authentication adopted in, for example, FeliCa® is performed.

When mutual authentication between the contactless communication medium 100 and the R/W 200 has been successful, each of the contactless communication medium 100 and the R/W 200 recognizes that its communication party is a qualified device. Then, a communication channel between the secure communication chip 120 of the contactless communication medium 100 and the controller 250 for secure processing of the R/W 200 (a communication channel via the R/W-controlling CPU 210 and the controller 230 for secure communication) is encrypted. That is, a communication channel through which encrypted data is to be exchanged (hereinafter also referred to as a cipher communication channel) is established between the secure communication chip 120 of the contactless communication medium 100 and the controller 250 for secure processing of the R/W 200.

Consequently, secure communication can be performed between the secure communication chip 120 of the contactless communication medium 100 and the controller 230 for secure communication (or further, the controller 250 for secure processing) of the R/W 200.

5. Process Related to Wireless Power Transmission

Next, a process related to the wireless power transmission will be described. When mutual authentication has been successful, the R/W-controlling CPU 210 of the R/W 200 transmits an instruction 1700 to the power transmission controller 240 to start wireless power transmission.

The power transmission controller 240, upon receiving the instruction 1700 from the R/W-controlling CPU 210 to start power supply, starts to output an RF signal for wireless power transmission via the power transmission antenna 241 in accordance with the instruction 1700 to start power supply. Accordingly, wireless power transmission to the contactless communication medium 100 starts.

The power reception controller 130, after the mutual authentication has succeeded as described above, receives power, which is transmitted by the wireless power transmission started by the power transmission controller 240 of the R/W 200, via the power reception antenna 131.

Then, the power reception controller 130 starts supply of the power (power supply), which has been transmitted by the wireless power transmission, to the feed controller 135. Accordingly, the feed controller 135 starts to operate with the power from the power reception controller 130 as a power source.

When the feed controller 135 of the contactless communication medium 100 has started to operate, the secure communication chip 120 that has succeeded in mutual authentication supplies switch control information to the feed controller 135.

The feed controller 135, after having started to operate, stores the switch control information from the secure communication chip 120, and continuously keeps on storing the switching control information while the feed controller 135 is supplied with power from the power reception controller 130.

Then, the feed controller 135, in accordance with the stored switch control information, turns on or off the built-in switch. Depending on the switch state, power from the power reception controller 130 is supplied to the card-controlling CPU 110, the nonvolatile memory 111, and the slave controller 112 for high-speed wireless communication, or alternatively, the power supply is shut off.

That is, if the secure communication chip 120 has recognized that the R/W 200 is a qualified device in mutual authentication, the secure communication chip 120 supplies switch control information for turning on the switch to the feed controller 135.

Thus, if the R/W 200 is a qualified device, the feed controller 135 turns on the built-in switch. Accordingly, power is fed to the card-controlling CPU 110, the nonvolatile memory 111, and the slave controller 112 for high-speed wireless communication. Meanwhile, if the R/W 200 has not been able to be recognized as a qualified device, switch control information for turning off the switch is supplied to the feed controller 135.

Therefore, if the R/W 200 is not a qualified device, the feed controller 135 turns off the built-in switch. Accordingly, power feeding to the card-controlling CPU 110, the nonvolatile memory 111, and the slave controller 112 for high-speed wireless communication is shut off.

Consequently, it is possible to prevent unauthorized access to the nonvolatile memory 111 of the contactless communication medium 100 by an unauthorized R/W that is not a qualified device. Thus, even if power is transmitted from the R/W 200 by wireless power transmission, feeding of the power to the card-controlling CPU 110, the nonvolatile memory 111, and the slave controller 112 for high-speed wireless communication of the contactless communication medium 100 is shut off unless mutual authentication has been successful between the secure communication chip 120 and the controller 230 for secure communication (or further, the controller 250 for secure processing).

Consequently, as the card-controlling CPU 110, the nonvolatile memory 111, and the slave controller 112 for high-speed wireless communication of the contactless communication medium 100 are not allowed to perform high-speed communication, unauthorized access to the nonvolatile memory 111 can be prevented (the protection function can be reinforced).

If mutual authentication between the contactless communication medium 100 and the R/W 200 has been successful, the feed controller 135 feeds the power from the power reception controller 130 to the card-controlling CPU 110, the nonvolatile memory 111, and the slave controller 112 for high-speed wireless communication. Accordingly, the card-controlling CPU 110, the nonvolatile memory 111, and the slave controller 112 for high-speed wireless communication, which are the blocks for performing high-speed communication, start to operate with the power supplied from the power reception controller 130 via the feed controller 135 as a power source.

Meanwhile, the R/W-controlling CPU 210 of the R/W 200, after having transmitted an instruction to start power supply, waits for an adequate time, and then transmits a secure communication RFoff command to the controller 230 for secure communication. The controller 230 for secure communication, upon receiving the secure communication RFoff command from the R/W-controlling CPU 210, stops outputting an RF signal for secure communication from the antenna 231 for secure communication in accordance with the secure communication RFoff command.

When the controller 230 for secure communication has stopped outputting an RF signal, the secure communication chip 120 of the contactless communication medium 100 becomes unable to obtain power as a power source, and thus stops its operation.

6. Encryption Process in High-Speed Wireless Communication

Next, an encryption process in the high-speed wireless communication will be described. First, mutual authentication is performed between the secure communication chip 120 of the contactless communication medium 100 and the controller 230 for secure communication (or further, the controller 250 for secure processing) of the R/W 200. After the mutual authentication has succeeded, the R/W 200 receives secure storage area division information 530, which contains a set password (a hash password obtained by hashing the set password) stored in advance in the secure communication chip 120 of the contactless communication medium 100, from the contactless communication medium 100 via secure communication.

Further, if the set password, which is contained in the secure storage area division information 530 received from the contactless communication medium 100, matches an input password that is input by a user from the outside (the host device 290), the R/W 200 communicates encrypted data, which is obtained by encrypting data with an individual encryption key that is generated from the matched password, via high-speed communication.

Thus, it is possible to perform secure communication while suppressing a decrease in the communication rate of the high-speed communication performed between the slave controller 112 for high-speed wireless communication of the contactless communication medium 100 and the master controller 220 for high-speed wireless communication 220 of the R/W 200.

In addition, data stored in a user encrypted area of the nonvolatile memory 111 of the contactless communication medium 100 has been encrypted with an individual encryption key, and a hash password and an individual ID that are necessary to generate the individual encryption key are stored in built-in memory of the secure communication chip 120 with tamper-resistant properties. Thus, even if the contactless communication medium 100 has been handed over to a third party, leakage (outflow) of the data stored in the user encrypted area can be prevented.

If the R/W 200 outputs both an RF signal for secure communication and an RF signal used for wireless power transmission, there is a possibility that mutual interference may occur between the RF signal for secure communication and the RF signal used for wireless power transmission.

That is, a frequency of about several hundred kHz to several MHz, for example, is used as the frequency of an RF signal for wireless power transmission due to the reasons that a circuit with a GHz band is not easy to manufacture, a circuit with a frequency of several hundred kHz to several MHz is easy to manufacture, and component parts such as capacitors for building a circuit with a frequency of several hundred kHz to several MHz are inexpensive, which makes it possible to reduce the circuit cost.

When the power transmission controller 240 of the R/W 200 performs wireless power transmission with the aforementioned frequency, and FeliCa® is adopted as a communication mode of the secure communication as described above, for example, the carrier frequency of FeliCa® is 13.56 MHz that is close to the frequency of an RF signal used for wireless power transmission. Thus, mutual interference would occur between the carrier of FeliCa®, namely, an RF signal for secure communication and an RF signal used for wireless power transmission.

As described above, when there is a possibility that (the frequencies of) an RF signal for secure communication and an RF signal for wireless power transmission may interfere with each other, the controller 230 for secure communication of the R/W 200 desirably stops outputting an RF signal for secure communication before the wireless power transmission is started.

Therefore, in this embodiment, secure communication and wireless power transmission are performed at different timings in each process of the aforementioned "download simple billing," "multiple-content prepayment," "multiple-content postpayment," and "target content limited billing" to suppress the interference.

7. Structure of Money Information

FIG. 3 is a schematic diagram showing the structure of money information accumulated in the billing-compatible card-type contactless communication medium 100. The money information is managed by a money information management table 300. The money information management table 300 is stored in flash memory included in the card chip 120. The money information management table 300 contains multiple records (record information), each of which includes a pair of money balance 310 and money attributes 320.

In FIG. 3, the money balance 310 holds information such as a remaining balance (e.g., 1000 yen). The money attributes 320 hold one of the values of the following attributes, for example: "movies," "music," "games," and "all." Accordingly, for example, information to the effect that "the remaining balance for movies is 1000 yen," "the remaining balance for music is 2000 yen," or the like can be represented by each of the paired money balance 310 and money attributes 320.

8. Structure of Content Information

FIG. 4 is a schematic diagram showing the structure of content information accumulated in the billing-compatible card-type contactless communication medium 100. The content information is managed by a content information management table 400. The content information management table 400 is stored in flash memory included in the card chip 120. The content information management table 400 contains multiple records, each of which includes a pair of content information 410 and content status 420. Meanwhile, actual contents are stored in the nonvolatile memory 111.

The content information 410 in FIG. 4 corresponds to information such as a title and size of a content contained in the nonvolatile memory 111. The content status 420 is information indicating the status of the content, and corresponds, for example, to one of the following information (values): "being written," "writing done," "payment done," and "viewing done."

Herein, the FeliCa card chip 120 has tamper-resistant properties as described above. As the money information management table 300 and the content information management table 400 are stored in the card chip 120 with a tamper-resistant function, tampering of the tables can be surely prevented.

Hereinafter, an operation of a process of writing a content to, reading a content from, and billing to/making a payment with the billing-compatible card-type contactless communication medium 100 will be described. Hereinafter, timing control for each of the FeliCa communication, high-speed wireless communication, and wireless power feeding during the process of writing a content, reading a content, and billing for the content will be described in detail.

FIG. 5 is a timing chart showing a sequence of a process of depositing money into the billing-compatible card-type contactless communication medium 100. It is assumed herein that the initial mutual authentication process has already been completed by passing the billing-compatible card-type contactless communication medium 100 over the billing-compatible reader/writer device 200.

In FIG. 5, FeliCa communication is performed in a period A to perform a money depositing process. As shown in FIG. 5, in the period A in which the money depositing process is performed, only FeliCa communication is used, and neither high-speed wireless communication nor wireless power transmission is used. Hereinafter, such processes will be all controlled by the billing-compatible reader/writer device 200.

When power transmission is performed between the power reception controller 130 and the power transmission controller 240, the frequency used is about 200 kHz. Meanwhile, the frequency and the data transfer rate of FeliCa communication are 13.56 MHz and 212 kbps, respectively. Therefore, it is conceivable that the two frequency bands would interfere with each other.

In this embodiment, neither high-speed wireless communication nor wireless power transmission is used while FeliCa communication is performed. Therefore, their frequency bands would not interfere with each other, and the money depositing process can be surely performed. Thus, the reliability of the money depositing process can be significantly enhanced.

The money depositing process is realized by performing reading and writing processes to the money information management table 300 stored in the flash memory in the secure card chip 120.

In this embodiment, data written to the money information management table 300 differs depending on whether "typical money depositing" or "limited money depositing" is performed. Hereinafter, the two cases of the "typical money depositing" and the "limited money depositing" will be described.

The "typical money depositing" is a method in which the amount of money deposited into a card is available for a billing process for all contents. In this case, the value of the money balance 310 that corresponds to the money attributes 320 indicative of "all" is updated. Thus, the value of the money balance 310 that corresponds to the money attributes 320 indicative of "movies," "music," or "games" is not updated.

The "limited money depositing" is a money depositing method that can be used for a billing process for a specific content. In this case, if "games" are designated as the money attributes 320 of the limited money depositing, the value of the money balance 310 that corresponds to the money attributes 320 indicative of "games" is updated. Herein, it is assumed that a user selects the type of a content to be billed on a screen or the like in the limited money depositing.

9. Specific Procedure of Each Process

Next, each process of the "download simple billing," "multiple-content prepayment," "multiple-content postpayment," and "target content limited billing" described in the "1. Overview of the Present Embodiment" section above will be described in detail.

FIG. 6 is a timing chart showing a sequence of content writing and a payment process when the "download simple billing" method is executed. Assumed herein is a case in which, for example, a content is downloaded to a media car at a kiosk terminal or the like that is installed at a shop, and then a payment is made with the same media card.

Each of FeliCa communication, high-speed wireless communication, and wireless power transmission described below is assumed to be controlled by the billing-compatible reader/writer device 200.

In a period A of FIG. 6, FeliCa communication is used to check a balance by reading the money balance 310 from the billing-compatible card-type contactless communication medium 100. Next, in the same period A, FeliCa communication is used to write as the content information 410 information on a content to be written, and to concurrently rewrite the content status 420 with "being written."

Next, in a period B, FeliCa communication is turned off so that the content data that a user has specified is written to the nonvolatile memory 111. Thus, high-speed wireless communication and wireless power transmission are turned on. Accordingly, the content data can be written to the nonvolatile memory 111 using high-speed wireless communication. In addition, as the wireless power transmission is performed while the content data is being written, a shortage of the power of the billing-compatible card-type contactless communication medium 100 can be prevented while writing is performed. Further, as there is no possibility that the FeliCa communication and the wireless power transmission may interfere with each other, the FeliCa communication and the wireless power transmission can be performed individually and stably.

While a content is being written, periods C are provided at regular intervals, so that the number of the bytes of the already written content data is written to the secure card chip 120 using FeliCa communication. At this time, the high-speed wireless communication and the wireless power transmission are turned off.

Accordingly, even when a disconnection of communication has occurred with, for example, a relative positional displacement between the card-type contactless communication medium 100 and the reader/writer device 200, the card chip 120 keeps on storing the number of the already written bytes, the content information 410, and the content status 420. Thus, a restart process can be performed on the basis of the number of the bytes that have already been written to the card chip 120, the content information 410, and the content status 420.

When writing of all contents is complete, a process of making a payment with and writing rights information to the secure card chip 120 is performed in a period D using FeliCa communication. Specifically, a process of updating the money balance 310 and rewriting the content status 420 with "payment done" is performed. At this time, the high-speed wireless communication and the wireless power transmission are turned off. Then, an amount corresponding to the content download fee is deducted from the money balance 310 that corresponds to the money attributes 320 of the downloaded content.

Accordingly, viewing of the content that has been downloaded to the billing-compatible card-type contactless communication medium 100 is permitted. Hereinafter, a processing method when the content is viewed will be described.

FIG. 7 is a timing chart showing a content reading sequence when the "download simple billing" method is executed. In a period A of FIG. 7, the content information 410, the content status 420, and the rights information are read using FeliCa communication. Herein, if the content status 420 indicates "payment done" and valid rights information can be confirmed, a normal reading process is performed.

In the following period B, FeliCa communication is turned off, and the billing-compatible reader/writer device 200 reads the content contained in the nonvolatile memory 111 using high-speed wireless communication and wireless power transmission. The read content data is transmitted to the host device 290 so that the content is reproduced on the host device 290.

Next, a process of the "multiple-content prepayment" will be described. FIG. 8 is a timing chart showing a sequence of an advanced content writing process when the "multiple-content prepayment" method is executed. Assumed herein is a process of, for example, writing multiple protected contents to a media card in advance at shop or the like.

In a period A of FIG. 8, content data is transmitted to the billing-compatible card-type contactless communication medium 100 using high-speed wireless communication and wireless power transmission so that protected contents are written to the nonvolatile memory 111. When writing is complete in a period B, the content information is written to the card chip 120 using FeliCa communication. Specifically, the content information 410 is updated and the content status 420 is also updated to "writing done." Herein, as a payment process has not been completed yet with the content status 420 indicating "writing done," normal viewing is not permitted at this stage.

FIG. 9 is a timing chart showing a sequence of a billing process and content reading when the "multiple-content prepayment" method is executed. Assumed herein is a case in which payment is made in advance for a title that is desired by a user among the multiple protected contents, so that viewing of the relevant content is permitted.

In a period A of FIG. 9, a process of making a payment for a title that is desired by a user is performed using FeliCa communication. Specifically, the money balance 310 contained in the secure card chip 120 is updated, and the content status 420 is also updated to "payment done." For example, if a user makes a prepayment for a "movie" among the contents stored in the nonvolatile memory 111 of the billing-compatible card-type contactless communication medium 100, the value of the money balance 310 that corresponds to the money attributes 320 indicative of "movies" is deducted. Further, if the valid rights information can be confirmed, normal viewing of the content for which a payment has been made is permitted.

Next, in a period B, the content status 420 and the rights information are read using FeliCa communication. Herein, if the content status 420 indicates "payment done," a normal process of reading the content is permitted. In the following period C, FeliCa communication is turned off, and the content contained in the nonvolatile memory 111 is read using high-speed wireless communication and wireless power transmission. The read content data is transmitted to the host device 290 so that the content is reproduced on the host device 290.

FIG. 10 is a timing chart showing a content reading sequence when the multiple-content postpayment" method is executed. Assumed herein is a process in which multiple protected contents have been written to a media card in advance at a shop or the like, and thereafter, a user stores a flag to be billed later for only a content that the user has viewed. The method of writing the contents herein is the same as that shown in FIG. 8. Thus, description thereof is omitted herein. Described hereinafter is a process sequence when a user views a desired content.

First, as shown in FIG. 10, the content information management table 400 is read in a period A using FeliCa communication. A user specifies a desired content from among at least one piece of the content information 410 contained in the content information management table 400.

In the following period B, FeliCa communication is turned off, and the content contained in the nonvolatile memory 111 is read using high-speed wireless communication and wireless power transmission. The read content data is transmitted to the host device 290 so that the content is reproduced on the host device 290.

Next, a mark, which indicates that the content has been viewed, is written to the secure card chip 120 at the timing when reproduction of the content has started or terminated. Specifically, in a period C, the content status 420 corresponding to the content information 410 contained in the secure card chip 120 is updated to "viewing done." Accordingly, the user would no longer be able to view the same content.

FIG. 11 is a timing chart showing a sequence of a postbilling process when the "multiple-content postpayment" method is executed. Assumed herein is a case in which the billing-compatible card-type contactless communication medium 100 with which a user has viewed a content in the sequence shown in FIG. 10 is returned to the shop or the like, where a payment process is performed.

In a period A of FIG. 11, the content information 410 contained in the secure card chip 120 is read using FeliCa communication. Then, in the next period B, a payment process is performed for a content whose content status 420 corresponding to the content information 410 has a value indicating "viewing done." Specifically, the money balance 310 contained in the secure card chip 120 is updated. Further, the content status 420 is updated to "payment done" to prevent double payment.

FIG. 12 is a timing chart showing a sequence of content writing and a billing process when the "target content limited billing" method is executed. It is assumed herein that money depositing with the procedures shown in the "limited money depositing" in FIG. 5 has already been completed. Although the present payment processing method can be applied to all of the billing and payment processes shown in FIGS. 6, 9, and 11, it is assumed herein that the present payment method is applied to the payment process shown in FIG. 9 as an example.

In a period A of FIG. 12, the content information management table 400 is read using FeliCa communication. A user selects a desired content from among one or more pieces of the content information 410 contained in the content information management table 400, and then proceeds to the next payment process. In the following payment process, the content attributes are determined from the content information 410, and the corresponding money attributes 320 are determined from the money information management table 300.

Next, a payment process is performed on the basis of the information on the money balance 310 corresponding to the selected money attributes 320. Herein, if the selected money balance 310 is insufficient, an update process is performed to the money balance 310 corresponding to the money attributes 320 indicative of "all." Accordingly, content downloading and a payment process can be all performed with a single media card.

According to the embodiments described above, content downloading and a billing process can be all performed with a single media card by providing the media card with a billing function. In addition, as all of the processes are performed via contactless communication, just a "passing" action will allow a content to be written and a billing process to be performed. In addition, as a user performs a billing process in advance to a media card with multiple contents written thereto, it is possible to allow only a desired content to be viewed. Further, it is also possible to bill a media card with multiple contents written thereto for only a content that a user has actually viewed. Furthermore, if money is deposited into a card in a manner associated with a specific content such as a movie or a game, it becomes possible to restrict the contents that can be purchased.

Although the preferred embodiments of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

What is claimed is:

1. A communication device comprising:
   a secure communication unit configured to perform secure communication, the secure communication being secure close-proximity communication;

a high-speed communication unit configured to perform high-speed communication, the high-speed communication being close-proximity communication that is faster than the secure communication; and a power transmission unit configured to supply power to the high-speed communication unit and not to the secure communication unit, in which the secure communication unit is configured to receive power from an external source which is remote from the communication device, wherein the secure communication by the secure communication unit and the supply of power by the power transmission unit to the high-speed communication unit are performed at timings that do not temporally overlap with each other.

2. The communication device according to claim 1, further comprising:

a content storage unit configured to store a content that has been downloaded via the high-speed communication;

a secure memory configured to hold information on the content; and an information writing unit configured to, when the content is downloaded, write payment information on the downloading of the content into the secure memory via the secure communication.

3. The communication device according to claim 2, wherein when the content is downloaded, downloading via the high-speed communication and writing of the amount of data that has been downloaded to the secure memory are alternately performed.

4. The communication device according to claim 1, further comprising:

a content storage unit configured to store multiple contents;

a secure memory configured to hold information on the contents; and an information writing unit configured to, before the contents are transferred to a reader/writer device via the high-speed communication, write payment information on at least one of the multiple contents to the secure memory via the secure communication, wherein the content whose payment information has been written among the multiple contents is transferred to the reader/writer device via the high-speed communication.

5. The communication device according to claim 1, further comprising:

a content storage unit configured to store multiple contents;

a secure memory configured to hold information on the contents;

an information writing unit configured to, when at least one of the contents has been transferred to a reader/writer device, write transfer complete information to the secure memory via the secure communication, the transfer complete information indicating that the transfer of the content is complete; and a payment processing unit configured to make a payment for the transferred content on the basis of the transfer complete information.

6. The communication device according to claim 1, further comprising:

a content storage unit configured to store multiple contents;

a secure memory configured to hold information on the contents; and a payment processing unit configured to, before the contents are transferred to the reader/writer device, make a payment for a content that is permitted to be paid for among the multiple contents, via the secure communication, wherein the content that has been paid for among the multiple contents is transferred to the reader/writer device via the high-speed communication.

7. A communication method, comprising the steps of:

storing a content that has been downloaded via high-speed communication by a high-speed communication unit; and writing, when the content is downloaded, payment information on the downloading of the content to a secure memory via secure communication by a secure communication unit, the secure communication being secure close-proximity communication that is slower than the high-speed communication, in which during operation power is supplied to the high-speed communication unit from a power transmission unit which does not supply power to the secure communication unit, in which the secure communication unit receives power from a source other than the power transmission unit, wherein the secure communication by the secure communication unit and the supply of power by the power transmission unit to the high-speed communication unit are performed at timings that do not temporally overlap with each other.

8. A communication method comprising the steps of:

storing multiple contents in a content storage unit;

holding information on the contents in a secure memory;

writing, before the contents are transferred to a reader/writer device via high-speed communication by a high-speed communication unit, payment information on at least one of the multiple contents to the secure memory via secure communication by a secure communication unit, the secure communication being secure close-proximity communication that is slower than the high-speed communication; and transferring to the reader/writer device via the high-speed communication the content whose payment information has been written among the multiple contents, in which during operation power is supplied to the high-speed communication unit from a power transmission unit which does not supply power to the secure communication unit, in which the secure communication unit receives power from a source other than the power transmission unit, wherein the secure communication by the secure communication unit and the supply of power by the power transmission unit to the high-speed communication unit are performed at timings that do not temporally overlap with each other.

9. A communication method comprising the steps of:

storing multiple contents in a content storage unit;

holding information on the contents in a secure memory;

making, before transferring the contents to a reader writer via high-speed communication by a high-speed communication unit, a payment for a content that is permitted to be paid for among the multiple contents, via secure communication by a secure communication unit, the secure communication being secure close-proximity communication that is slower than the high-speed communication; and transferring the content that has been paid for among the multiple contents to the reader/writer device via the high-speed communication, in which during operation power is supplied to the high-speed communication unit from a power transmission unit which does not supply power to the secure communication unit, in which the secure communication unit receives power from a source other than the power transmission unit, wherein the secure communication by the secure communication unit and the supply of power by the power transmission unit to the high-speed communication unit are performed at timings that do not temporally overlap with each other.

10. A communication system comprising:

a communication device; and a reader/writer device, wherein the communication device includes a secure communication unit configured to perform secure communication that is secure close-proximity communication, a high-speed communication unit configured to perform high-speed communication that is faster close-proximity communication than the secure communication, and a power transmission unit configured to supply power to the high-speed communication unit and not to the secure communication unit, wherein the secure communication unit receives power from a source other than the power transmission unit, wherein the secure communication by the secure communication unit and the supply of power by the power transmission unit to the high-speed communication unit are performed at timings that do not temporally overlap with each other, and wherein the reader/writer device is configured to perform one of the secure communication with, the high-speed communication with, and the power transmission to the communication device.

11. The communication system according to claim 10, wherein the communication device further includes:

a content storage unit configured to store multiple contents;

a secure memory configured to hold information on the contents; and an information writing unit configured to, before the contents are transferred to the reader/writer device, write payment information on at least one of the multiple contents to the secure memory, and wherein the content whose payment information has been written among the multiple contents is transferred to the reader/writer device via the high-speed communication.

12. The communication system according to claim 10, wherein the communication device further includes:

a content storage unit configured to store multiple contents;

a secure memory configured to hold information on the contents;

an information writing unit configured to, when at least one of the contents has been transferred to the reader/writer device, write transfer complete information to the secure memory via the secure communication, the transfer complete information indicating that the transfer of the content is complete; and a payment processing unit configured to make a payment for the transferred content on the basis of the transfer complete information.

13. The communication system according to claim 10, wherein the communication device further includes:

a content storage unit configured to store multiple contents;

a secure memory configured to hold information on the contents; and a payment processing unit configured to, when at least one of the contents has been transferred to a reader/writer device via high-speed communication, make a payment based on transfer complete information indicating the transfer of the content, and wherein the content that has been paid for among the multiple contents is transferred to the reader/writer device via the high-speed communication.

14. The communication system according to claim 10, wherein the communication device further includes:

a content storage unit configured to store multiple contents;

a secure memory configured to hold information on the contents; and a payment processing unit configured to, before the contents are transferred to the reader/writer device, make a payment for a content that is permitted to be paid for among the multiple contents, via the secure communication, and wherein the content that has been paid for among the multiple contents is transferred to the reader/writer device via the high-speed communication.

* * * * *